United States Patent
Einhorn

[15] 3,704,602
[45] Dec. 5, 1972

[54] REINFORCED CAST NYLON COUPLING ELEMENT

[72] Inventor: Stanley C. Einhorn, Newark, Del.

[73] Assignee: The Budd Company, Philadelphia, Pa.

[22] Filed: May 28, 1971

[21] Appl. No.: 148,002

Related U.S. Application Data

[63] Continuation-in-part of Ser. No. 94,136, Dec. 1, 1970, abandoned.

[52] U.S. Cl..............................64/11 R, 64/27 NM
[51] Int. Cl..............................................F16d 3/52
[58] Field of Search..................64/11 R, 13, 27 NM

[56] References Cited

UNITED STATES PATENTS

| | | | |
|---|---|---|---|
| 2,824,434 | 2/1958 | Stern | 64/27 X |
| 2,896,431 | 7/1959 | Stillwagon, Jr. | 64/11 |
| 3,332,255 | 7/1967 | Seagreaves et al. | 64/11 |
| 3,354,670 | 11/1967 | Fawick | 64/11 |

*Primary Examiner*—Kenneth W. Sprague
*Attorney*—Thomas I. Davenport et al.

[57] ABSTRACT

A cast nylon coupling element includes a central opening adapted to receive connecting elements of shafts from a pair of movable bodies to be coupled. The nylon body is press fitted into a metal cylindrical member which provides reinforcement about the circumference of the nylon body. A flexible reinforcement is also included within the nylon body.

7 Claims, 9 Drawing Figures

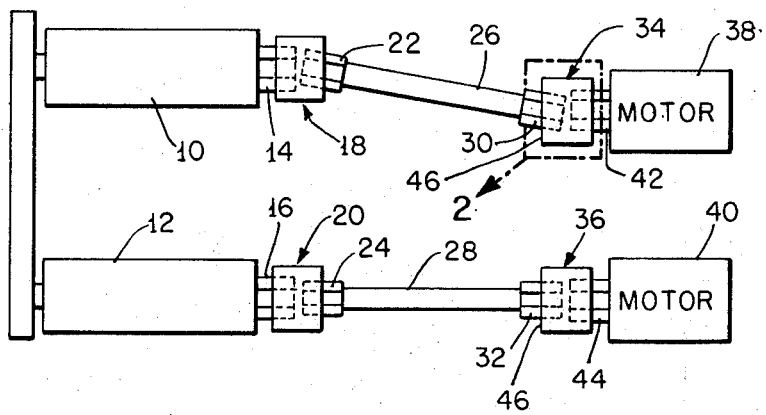
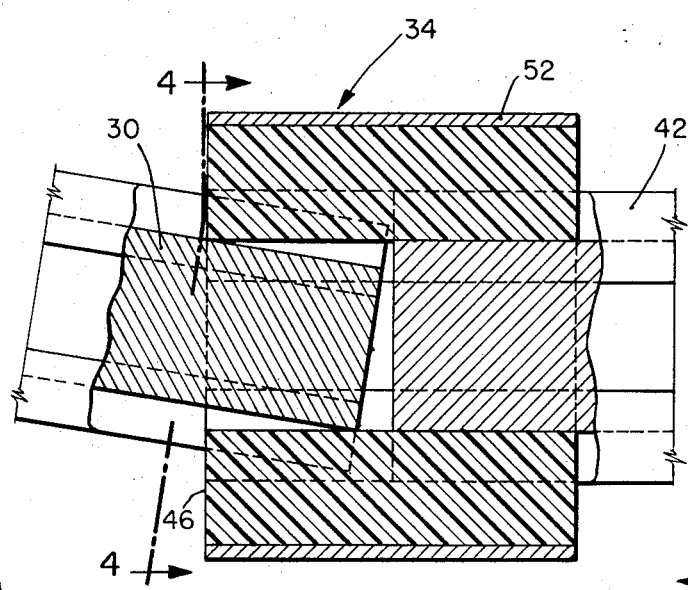
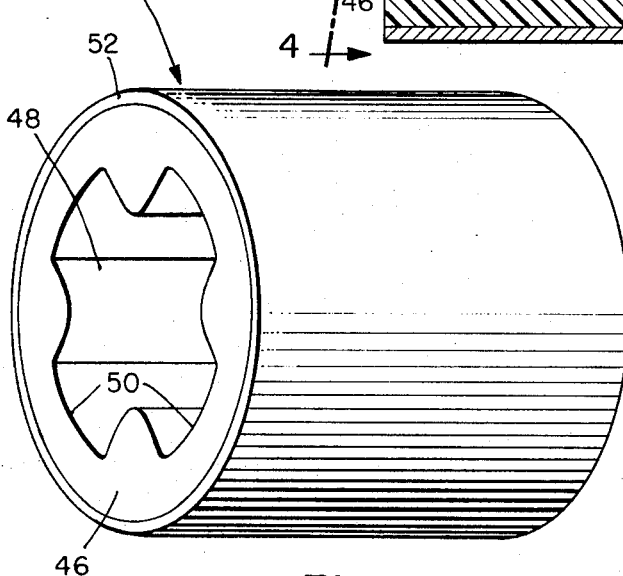
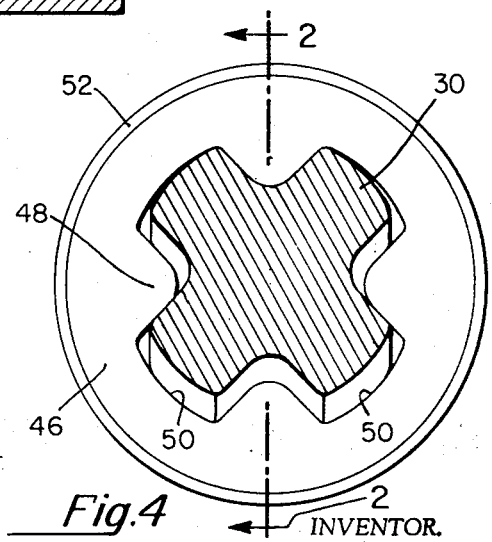
Fig.1
Fig.2
Fig.3
Fig.4
INVENTOR.
STANLEY C. EINHORN
BY
Edward M. Farrell
ATTORNEY

PATENTED DEC 5 1972

3,704,602

INVENTOR.
STANLEY C. EINHORN
BY
Edward M. Farrell

INVENTOR.
STANLEY C. EINHORN

REINFORCED CAST NYLON COUPLING ELEMENT

This application is a continuation-in-part of an application entitled "Reinforced Cast Nylon Coupling Element", Ser. No. 94,136 filed Dec. 1, 1970, now abandoned.

Coupling elements for coupling a driving device, such as a motor, to a device to be driven, such as a roller, have been used extensively in steel mills. Such coupling elements have been used in rod mills, rail mills, merchant mills, etc. In the main, such coupling devices have been made from cast steel.

The use of cast steel as coupling elements has produced a number of problems. First, the coupling elements tend to break or crack. They also tend to wear very fast, in some cases requiring replacement within one week.

In a typical application in a steel mill, the driving mechanism may be coupled to a roller. The roller generally includes a spline or wobbler at its outer end which is inserted into one end of the coupling element. The other end of the coupling element may be connected to a spindle, which is driven by suitable means. The use of steel as coupling elements results in wear of the splines and connecting spindles. The roll life is also reduced.

Coupling elements made of cast steel are generally extremely heavy. Some of the coupling elements used in steel mills, for example, weigh as much as 2800 pounds making them very hard to handle and tending to produce safety hazards A most important disadvantage of using metal coupling elements is that they produce a very noisy environment. Because of the extreme noise produced in steel mills, it is known that many workers in steel mills over a number of years tend to become hard of hearing.

The use of cast nylon has been recognized for many of its characteristics relating to quietness, lightness and the fact that its use does not require lubricants. Heretofore, however, it has not been adaptable for use in coupling boxes of the types used in steel mills requiring extremely heavy loads.

In considering the use of nylon material in place of steel in cylindrical coupling members, such as wobbler boxes, several problems are presented. First, the interior protruding portions designed to operatively engage the metallic splines, tend to break when subjected to stresses. Second, the main body of the nylon body is subjected to radial pressures tending to break or crack the nylon body.

It is known to provide reinforcements in nylon products. One such product is described in a patent to Einhorn U.S. Pat. No. 3,452,556 entitled "Reinforcement Cast Nylon Slipper Bearings for Universal Joints". As pointed out in this patent the shrinkage problem relating to nylon during a casting operation preclude the use of unflexible reinforcements within the nylon.

It is an object of this invention to provide an improved coupling member which will not tend to crack or break when subjected to high pressures.

It is a further object of this invention to provide an improved coupling member with longer life over many conventional coupling members used heretofore.

It is still a further object of this invention to provide an improved coupling member which will not tend to wear the elements which it is designed to couple.

It is still a further object of this invention to provide an improved coupling member which is lighter than many conventional coupling members used heretofore.

It is still a further object of this invention to provide an improved coupling member which minimizes the noise generated during operation of the coupled elements.

In accordance with the present invention, a coupling element for coupling a driving mechanism to a driven member comprises a main circular nylon body having a central opening extending therethrough. The central opening includes radial projecting portions to receive and couple a spindle from the driving mechanism to a spline of a movable roller, for example. A metal cylindrical reinforcement member is press fitted around the outer periphery of the nylon body. Additional flexible re-inforcement means are provided within the nylon body and extends into the projecting portions.

Other objects and advantages of the present invention will be apparent and suggest themselves to those skilled in the art, from a reading of the following specification and claims, in conjunction with the accompanying drawing, in which:

FIG. 1 illustrates a general arrangement in which coupling elements embodying the present invention are included;

FIG. 2 is an enlarged cross sectional view of the elements included in block 2 of FIG. 1;

FIG. 3 is a perspective view of a coupling element embodying the present invention;

FIG. 4 is a cross sectional view taken along lines 4—4 of FIG. 2;

Figure 5:
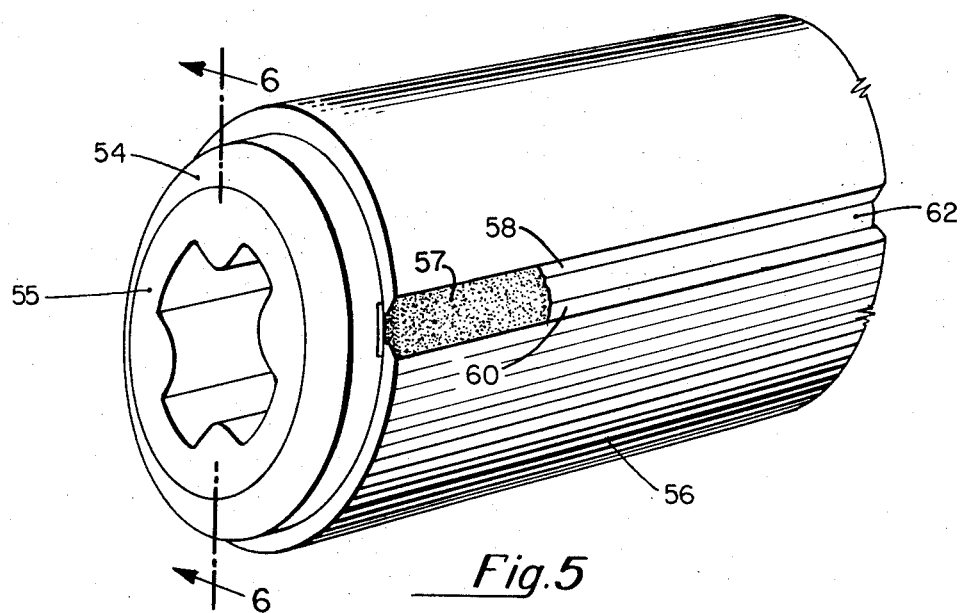
FIG. 5 is a view illustrating another embodiment of the present invention.

Referring particularly to FIG. 1, a simplified system such as used in a rolling mill is illustrated. Numerous details relating to such systems are omitted because they are not directly related to the subject invention.

A pair of rolls 10 and 12 are adapted to be moved relative to each other. The roll 10 is illustrated as being in an up position and is adapted to be moved downwardly toward the roll 12. The rollers 10 and 12 are adapted to receive sheets of steel therebetween to perform a forming operation.

The rollers 10 and 12 include a pair of spindles 14 and 16, respectively adapted to be loosely fit into a pair of coupling elements or wobbler boxes 18 and 20.

The coupling elements 18 and 20 are also adapted to receive a pair of splines or wobblers 22 and 24, respectively, which are connected to the ends of a pair of spindles or shafts 26 and 28. The spindles 26 and 28 include splines 30 and 32 at their opposite ends which are adapted to fit into coupling elements 34 and 36.

A pair of motors 38 and 40 is connected to drive a pair of splines 42 and 44, which are loosely coupled to the coupling elements 34 and 36, respectively.

FIGS. 1, 2 and 4 illustrated that the spindles 26 and 28 are free to move about some predetermined angles, generally not exceeding 15 degrees. Heretofore, when the coupling boxes, such as coupling elements 18, 20, 34 and 36 were made of metal, the various elements coupled were subject to high frictional wear. Because of the relatively loose couplings involved, the noise generated from the operations was also very great. In addition to the excessive wear, cracking and noise resulting from metal coupling elements, the parts coupled heretofore with metal coupling elements have required constant lubrication of the parts involved. The need for lubrication often required stopping the operation of the system while appropriate maintenance procedures were followed. All of this tended to be very time consuming and costly.

FIGS. 2 and 4 illustrate the relative movement of the wobbler 30 within the coupling element 34. It is seen from this figure that the wobbler 30 is adapted to be moved in and out about a predetermined angle while rotating thereby producing extreme frictional wear.

Referring particularly to FIG. 3, the coupling element 34 embodying the present invention is illustrated. Similar coupling elements would be used as coupling elements 18, 20 and 36. The coupling element 34 includes a main polyamide body which comprises a cast nylon body 46 having a central opening 48 extending therethrough. The central opening 48 includes four radially projecting open areas 50. The central opening 48 is dimensioned to receive the wobbler or spline elements from the rollers and motors at one end. The ends of the spindles are inserted into the opening 48 at the other end.

The main cast nylon body is surrounded by a metal cylindrical member 52. The cylindrical member is made of a high tensile material, such as steel. The metal cylindrical member provides a strong structural reinforcement for the nylon body 46. When stresses are developed within the cast nylon body 46, the cylindrical body 52 prevents the body from splitting.

The cast nylon body 46 has the characteristic that it does not require lubrication. At the same time the body is not subject to excessive wear. Because of the relatively low frictional characteristics of the nylon material relatively little noise is generated in a system such as illustrated in FIG. 1, as compared with prior art systems wherein metal coupling elements have been employed.

Figure 6:
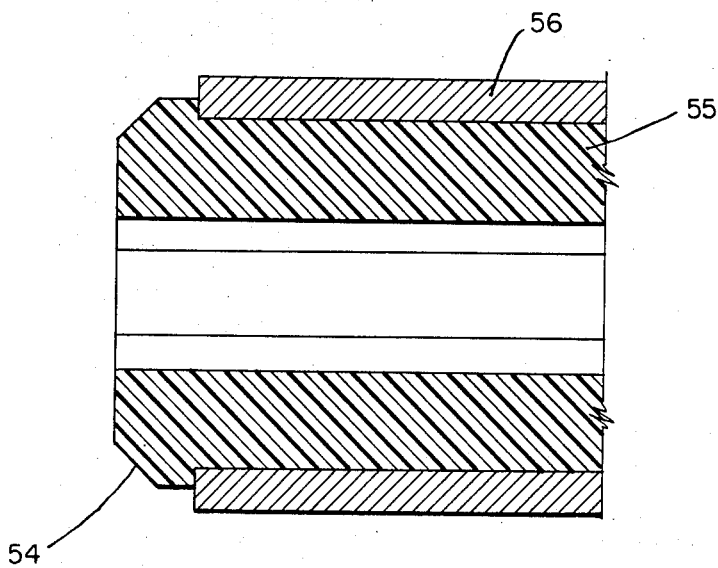
FIG. 6 is a cross sectional view taken along lines 6—6 of FIG. 5.

Referring to FIGS. 5 and 6, a slightly different embodiment of the invention is illustrated.

In this embodiment, a chamfer portion 54 of the main nylon body 55 extends beyond the steel sheath or cylinder 56. The extended chamfer is sometimes desirable because of local obstructions at the mill site. The circumference of the chamfer end portions may be greater than the circumference of the main nylon body 55. Consequently solid cylindrical members of less inner circumferences cannot normally be passed over the end portions to achieve a tight fit between the cylindrical member and the nylon body.

The sheath 56 is rolled and has a pair of "V" shaped end portions 58 and 60, having a small gap therebetween prior to welding. This arrangement makes it possible to fit the sheath over the larger end chamfer portions.

A thin copper protective strip 62 is slightly embedded in the nylon body 55 in a longitudinal direction. The portions 58 and 68 are welded together to form a tight holding of the sheath 56 on the nylon body 55. The thin strip 62 prevents harmful melting and outgasing of the nylon body during the welding operation. As the weld solidifies, the sheath 56 is drawn very tight around the nylon body 55. The weld material 57, only a portion of which is illustrated, may extend along the lengths of the member 56 and provide a relatively thick weld so that the area of the weld will be substantially as strong of the main body 56.

The tight fitting of the sheath 56 around the nylon body 55, along with the embedded strip 62 prevents movement of the sheath 56 when it is subjected to repeated impacts. It is believed that the tight fitting of the sheath around the nylon body may prestress the nylon body giving it extra load carrying capacity.

Figure 7:
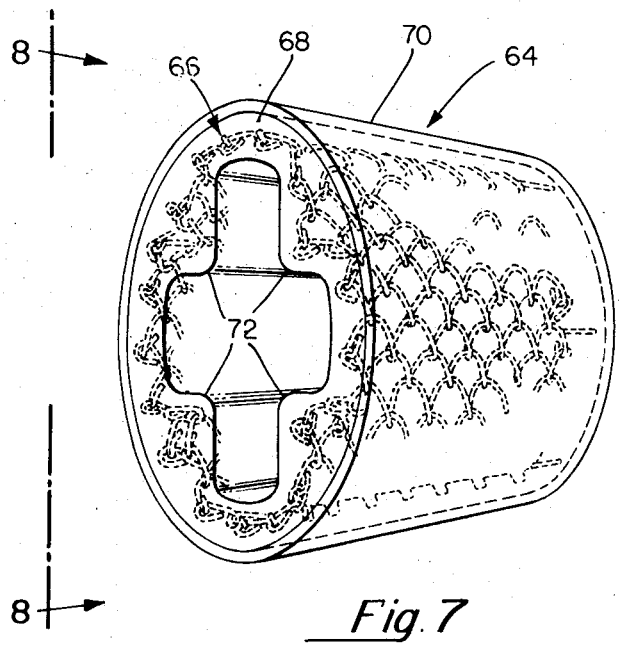
FIG. 7 is a perspective view of another embodiment of the present invention.
Figure 8:
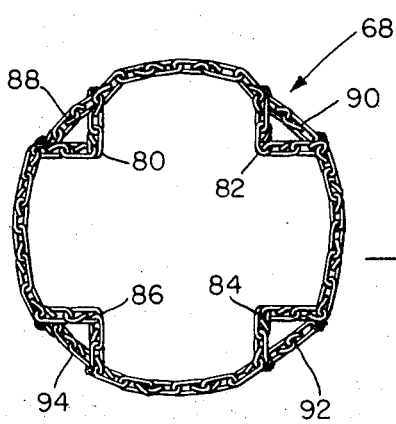
FIG. 8 is an end view of a reinforcement means included in the embodiment of FIG. 7.
Figure 9:
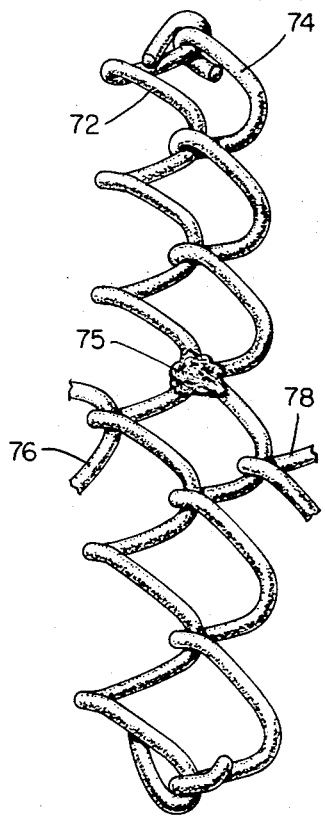
FIG. 9 is a portion of the reinforcement means illustrated in FIG. 8.

Referring particularly to FIGS. 7, 8 and 9, a coupling element or wobbler box 64 is substantially the same shape as the coupling element 34 described in connection with FIGS. 2, 3 and 4. However, an additional reinforcement element 66 is included within a nylon body 68. A metal cylindrical member 70, similar to one previously described, surround the nylon body 68.

Portions 72 project radially inwardly from the axis of the nylon body. These projecting portions are disposed to make direct contact with the splines of the shafts to be connected in an overall system in a steel mill, for example. The portions 72 are subject to stresses parallel to the axis of rotation which tend to crack or break off the projecting portions during operation. For this reason, it is sometimes necessary to provide the additional reinforcement member 66.

As is well known in the prior art, cast nylon has the characteristic of decreasing in dimension due to volume loss and thermal shrinkage during manufacture. The use of rigid metal inserts, as pointed out in the aforementioned patent, is impractical because of the severe warping that would occur and the large internal stresses which would be built up in the finished product. It is recognized that a generally circular reinforcement member would not take care of the protruding sections of the nylon body.

The reinforcement member 66 comprises a coiled wire having some of the characteristics of the reinforcement means described in the aforementioned patent. The element 66 may comprise a plurality of individual strands of wire capable of expanding or contracting in different directions, i.e. vertically, laterally, longitudinally and diagonally. The individual strands are interwoven and connected together in a suitable manner, such as by welding.

The reinforcement member 66 may comprise a plurality of strands of wire, such as illustrated in FIGS. 7 and 8, extending around the opening in the nylon body 68. A plurality of pairs of wires 72 and 74, such as illustrated in FIG. 9 are interwoven with each other in a zigzag direction with the ends of the individual strands being folded or bent over each other in the manner illustrated to form good mechanical connections. Each of the pair of wires 72 and 74 are connected to strands of the next adjacent pairs, as to strands 76, 78, for example. Each row of the strands of wire is welded together in only one spot, such as at spot 75, so as not to restrict the flexibility of the individual spirals in the strands while still providing suitable mechanical connections. At the same time, the member 66 provides sufficient unit rigidity to permit suspension and positioning in a mold in which the nylon product is formed.

The reinforcement member is first formed in a circular shape.

The member is then bent inwardly at four equally spaced point 80, 32, 84, and 86. These bends are in the directions of the protruding portions 72 in the nylon body. After the individual bends have been made, additional pairs of wire 88, 90, 92 and 94, similar to the pair illustrated in FIG. 9, are welded to the bent areas of the portions 80, 82, 84, and 86. The additional pair of wires is preferably welded along the length of the wire at each joint on the bent portions rather than at a single point. The overall structure at each of the bends is triangular in shape with a pair of twisted wire strands forming each of the sides of the triangle.

In some cases in place of the wire element 68, a solid metal piece having bends therein may be employed. The bends within the metal piece must be directed towards the protruding portions and permit the member to contract in accordance with shrinkage of the nylon body during formation.

Polyamides including cast nylon and its properties as well as its method of products are well known. For example, catalyzed and promoted caprolactam can be prepared by any of a number of methods. In one example, dry caprolactam may be reacted with 0.165 percent by weight of lithium hydride for 2 hours at 200° F., then reduced to 190° F. Another batch of dry caprolactam was prepared by dissolving it at 350° F., 0.43 by weight of Triphenoxytriazine. One part of the former is mixed with three parts of the latter to make up the catalyzed promoted mixture.

The present invention has provided a relatively simple means for eliminating many of the problems relating to cast steel coupling elements. One of its most important advantages relates to the noise pollution which has harmful effects on the physical and mental well-being of the workers involved in steel mills.

What is claimed is:

1. A coupling device for coupling a driving mechanism to a driven member comprising a polyamide body which has the characteristic of contracting during a casting operation, said polyamide body being cast in a cylindrical shape having a central opening extending therethrough to receive a coupling element from said driving mechanism and a second coupling element from said driven member, said polyamide body having projecting portions extending radially inwardly towards the axis of said polyamide body, a metal cylindrical reinforcement member of high tensile strength fitted around the outer periphery of said polyamide body and in tight physical contact therewith, said cylindrical metal reinforcement member extending along a substantial portion of the length of said polyamide body, said metal cylindrical member restraining said polyamide body to prevent said polyamide body from stretching outwardly when outward radial pressures are exerted against said polyamide body by said first and second coupling elements.

2. The invention as set forth in claim 1 wherein said cylindrical member comprises a rolled element having two ends, said ends being welded together to form a tight fitting around said polyamide body.

3. This invention as set forth in claim 2 wherein said polyamide body includes a longitudinal groove therein and an elongated metal strip, said elongated strip being embedded in said polyamide body along the ends of said rolled element at the area at which said ends are welded together, said elongated metal strip providing a protective shield between said polyamide body and said two ends of said rolled element during a welding operation.

4. The invention as set forth in claim 3 wherein said polyamide body includes a circular chamfer end portion extending beyond said cylindrical member, said end portion having a circumference greater then the circumference of said polyamide body.

5. A coupling device as set forth in claim 1 wherein a reinforcement member comprising a metallic member is disposed within said polyamide body, said reinforcement member having the characteristic of contracting in accordance with the contraction of said polyamide body during a casting operation, said metallic member extending around said opening in said polyamide body.

6. A coupling device as set forth in claim 5 wherein said metallic member comprises coiled spring wire members.

7. A coupling device as set forth in claim 6 wherein said coiled spring wire members form a substantially circular piece, with some of said spring members being substantially equally spaced with respect to each other and extending radially inwardly in the same directions as said projecting portions of said polyamide body.

* * * * *

UNITED STATES PATENT OFFICE
CERTIFICATE OF CORRECTION

Patent No. 3,704,602        Dated  December 5, 1972

Inventor(s) Stanley C. Einhorn

It is certified that error appears in the above-identified patent and that said Letters Patent are hereby corrected as shown below:

Column 1, line 55, "problem" should read -- problems -- .
Column 2, line 65, "illustrated" should read -- illustrate -- .
Claim 1, line 10, before "metal", insert -- non-resilient -- ;
line 11, after "member" insert -- having a thickness of at least one-eighth of an inch -- .

Signed and sealed this 8th day of May 1973.

(SEAL)
Attest:

EDWARD M. FLETCHER, JR.
Attesting Officer

ROBERT GOTTSCHALK
Commissioner of Patents